(12) United States Patent
Perbet et al.

(10) Patent No.: US 9,014,422 B2
(45) Date of Patent: Apr. 21, 2015

(54) METHOD OF RECOGNIZING A MOVING FEATURE IN A VIDEO SEQUENCE

(75) Inventors: Frank Perbet, Cambridgeshire (GB);
Atsuto Maki, Cambridgeshire (GB);
Bjorn Stenger, Cambridgeshire (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 652 days.

(21) Appl. No.: 13/389,018

(22) PCT Filed: Aug. 6, 2009

(86) PCT No.: PCT/GB2009/001948
§ 371 (c)(1),
(2), (4) Date: May 22, 2012

(87) PCT Pub. No.: WO2011/015801
PCT Pub. Date: Feb. 10, 2011

(65) Prior Publication Data
US 2012/0224744 A1    Sep. 6, 2012

(51) Int. Cl.
*G06K 9/00* (2006.01)
*G06T 7/20* (2006.01)

(52) U.S. Cl.
CPC ............... *G06T 7/2033* (2013.01); *G06T 7/208* (2013.01)

(58) Field of Classification Search
None
See application file for complete search history.

(56) References Cited

U.S. PATENT DOCUMENTS

| | | | |
|---|---|---|---|
| 6,925,410 B2 | 8/2005 | Narayanan | |
| 7,251,364 B2 | 7/2007 | Tomita, Jr. et al. | |
| 7,492,944 B2 | 2/2009 | Narayanan et al. | |
| 8,311,272 B2 | 11/2012 | Matsugu et al. | |
| 8,811,666 B2 * | 8/2014 | Maki et al. | 382/103 |
| 2002/0082026 A1 | 6/2002 | Narayanan | |
| 2003/0048849 A1 | 3/2003 | Tomita, Jr. et al. | |
| 2005/0192683 A1 | 9/2005 | Narayanan | |
| 2006/0280335 A1 | 12/2006 | Tomita, Jr. et al. | |
| 2008/0002862 A1 | 1/2008 | Matsugu et al. | |
| 2011/0106833 A1 * | 5/2011 | Albers et al. | 707/769 |

FOREIGN PATENT DOCUMENTS

| | | |
|---|---|---|
| JP | 2002-099918 A | 4/2002 |
| JP | 2008-009914 A | 1/2008 |

OTHER PUBLICATIONS

Office Action issued Mar. 18, 2014 in Japanese Patent Application No. 2012-523372 (with English language translation).
Perbet, F., et al., "Correlated Probabilistic Trajectories for Pedestrian Motion Detection," 2009 IEEE 12$^{th}$ International Conference on Computer vision, pp. 1647-1645, (Sep. 29-Oct. 2, 2009).

(Continued)

*Primary Examiner* — Atiba O Fitzpatrick
(74) *Attorney, Agent, or Firm* — Oblon, McClelland, Maier & Neustadt, L.L.P.

(57) ABSTRACT

A moving feature is recognized in a video sequence by comparing its movement with a characteristic pattern. Possible trajectories through the video sequence are generated for an object by identifying potential matches of points in pairs of frames of the video sequence. When looking for the characteristic pattern, a number of possible trajectories are analyzed. The possible trajectories may be selected so that they are suitable for analysis. This may include selecting longer trajectories that can be easier to analyze. Thereby where the object being tracked is momentarily behind another object a continuous trajectory is generated.

20 Claims, 14 Drawing Sheets

(56) References Cited

OTHER PUBLICATIONS

Perbet, F., et al., "Index of /work/cv; Publication date: Correlated Probabilistic Trajectories for Pedestrian Motion Detection," Internet Citation (Jul. 7, 2009) XP007912949, Retrieved from the Internet: URL: http://frank.perbet.org/work/cv/> [retrieved on May 5, 2010].

International Search Report Issued May 17, 2010 in PCT/GB09/01948 Filed Aug. 6, 2009.

Office Action mailed Oct. 29, 2013 in Japanese Application No. 2012-523372 (w/English translation).

Japanese Office Action issued Sep. 16, 2014 in Patent Application No. 2012-523372 (with English Translation).

\* cited by examiner

METHOD OF RECOGNIZING A MOVING FEATURE IN A VIDEO SEQUENCE

The invention relates to video analysis and more specifically to the recognition of moving features in a video based upon their motion.

The recognition of moving features such as people in videos has a number of applications. For example the recognition of pedestrians can be used to control automated breaking systems in cars.

In order to recognise a moving feature in a video, the motion of the feature through the frames of the video must be determined and then this motion is compared with the expected motion of that feature.

The motion or trajectory of a feature can be considered as the position of the feature in each of a number of frames of a video. More accurate results for the recognition can be obtained when longer trajectories are available. It is possible that the feature may be obscured in some of the frames of the video by occlusion. This will limit the length of any trajectory returned for such a feature. There may also be errors in matching feature between frames that can also limit the lengths of trajectories for features.

The selection of the characteristics of the expected motion of a feature also presents a challenge. Characteristics of the motion that will allow accurate classification are those where there is a sharp discrimination on the existence of the feature.

It is an object of the present invention to address the issues discussed above.

According to an aspect of the present invention, there is provided a method of recognising a moving feature in a video sequence. The moving feature has a characteristic pattern of motion over the video sequence. The video sequence comprises a first frame and a plurality of following frames.

The method comprises locating points of interest in each frame of the video sequence. The points of interest potentially correspond to the moving feature. In order to construct a trajectory for a feature in the first frame, correspondences between points of interest in a following frame and the frame preceding it are determined. It is possible that for a given point of interest in one frame, more than one point of interest in a following frame corresponding to it may be used. Using the correspondences between points of interest, trajectories for the points of interest in the first frame are constructed. Because of the possibility of multiple correspondences between points of interest between frames, more than one possible trajectory for a point of interest in the first frame may be found.

Once a plurality of trajectories for the points of interest in the first frame has been constructed, they are compared with the characteristic pattern of motion. Based on this comparison, a feature in the first frame can be recognised.

The method allows flexibility in the matching of points of interest between frames. Some of the plurality of trajectories may not track the same physical feature across all of the frames. However, because such a trajectory is not likely to exhibit the characteristic pattern, it will be excluded when the comparison with the characteristic pattern takes place. The flexibility is advantageous as when an object is obscured by occlusion, trajectories will still be generated even for the frames where the object is obscured. Further, when there is more than one potential match for an object across a pair of frames, these can all be included in the plurality of trajectories.

The first frame can be either the start of the video sequence or its end.

According to an embodiment of the present invention, the points of interest are matched between frames by considering the video sequence as a sequence of overlapping pairs of frames. In each pair of frames, the probability that each of a set of point of interest in the second frame of the pair corresponds the same feature as a point of interest in the first frame of the pair is calculated.

According to an embodiment of the present invention, the probability two point of interest in different frames correspond to the same feature is based on the spatial distance between the points of interest or the appearance similarity between the points of interest.

According to an embodiment of the present invention, the plurality of trajectories are determined by constructing an acyclic graph with nodes representing the points of interest in the frames and edges linking points of interest that correspond to the same feature in subsequent frames, and then traversing the graph.

According to an embodiment of the present invention, traversing the acyclic graph comprises making a probabilistic selection of edges at each node, based on an augmented probability. The augmented probability can include a factor depending on the traceable depth of the trajectory. This makes it possible to favour long trajectories that are likely to allow a more certain determination of whether the indicative relationship exists. The augmented probability can include a factor based on the conservation of a physical property such as speed. This makes it possible to favour trajectories that exhibit properties expected of physical objects and thus makes it possible to exclude unphysical trajectories.

According to an embodiment of the present invention, the trajectories are compared to the characteristic pattern using a random decision forest.

According to an embodiment of the present invention, the characteristic pattern is a correlation between two trajectories from the plurality of trajectories.

According to embodiments of the present invention, trajectories are analysed and classified based on correlations that may exist between pairs of trajectories.

The characteristic motion may be walking motion. There are a number of correlations that exist between the motions of the two feet of a walking pedestrian.

According to an embodiment of the present invention, first and second trajectories making up the pair of trajectories have a static phase and a dynamic phase. The indicative relationship between the pair of trajectories that is used to classify them is that the static phase of the first trajectory coincides with the dynamic phase of the second trajectory.

This analysis allows detection of pedestrians since the trajectories of the feet of a walking pedestrian exhibit a static phase and a dynamic phase. The standing foot of a pedestrian is stationary relative to the ground and is thus static. The second foot of the pedestrian moves relative to the ground and can thus be considered to be in a dynamic phase. As the pedestrian walks, each foot alternates between static and dynamic phases and while one foot is in a static phase, the other foot is in a dynamic phase.

According to an embodiment of the present invention, the indicative relationship between the first and second trajectories is a correlation between the directions of motion of the pair of trajectories.

The motions of the feet of a pedestrian are expected to be approximately parallel to a walking direction of the pedestrian. This can be used to identify pairs of trajectories that potentially relate to pairs of feet for a pedestrian.

According to an embodiment of the present invention, the correlation in the directions of motion of the first and second trajectories includes the first trajectory being substantially parallel to the second trajectory.

According to an aspect of the present invention there is provided a computer readable medium that carries instructions to cause a computer to carry out a method in accordance with the present invention.

According to an aspect of the present invention, a video analysis system for recognising a moving feature in a video is provided.

BRIEF DESCRIPTION OF THE DRAWINGS

In the following, embodiments of the invention will be described with reference to the drawings in which:

FIG. 1 shows a data processing system 100 for recognising a moving feature in a video. The data processing system 100 comprises a processor 102, a memory 104, an input module 108, and an output module 110. The memory 104 stores a program 106 for recognising a moving feature in a video. The program 106 can be executed on the processor 102. The input module 108 can receive input of a video sequence for analysis to recognise a moving feature in the video sequence and the output module 110 can output the results of the analysis. The input module 108 may be a data connection capable of receiving video data from a video camera or video recorder. The input module 108 may be a network connection capable of receiving video data over a network such as the internet. The data processing system 100 may be a convention computer. The methods followed by the program 106 are described below.

FIG. 2 shows a flow diagram of a method for recognising a moving feature in a video. The video comprises a sequence of frames. Each of the frames depicts a set of features at an instant of time. When the video is played, any motion of the features in the video is reflected by the changes in their position over consecutive frames of the video. It is therefore possible to consider a trajectory of a feature in the video as its position within each frame over the video sequence. By comparing the trajectory of the feature with the expected motion of an object, a feature can be recognised as corresponding to an object. For example, the feet of a walking person shown in a video will exhibit a characteristic pattern of motion; the feet of a walking person will have a stationary phase when a foot is in contact with the ground, and a moving phase when the foot is moving relative to the ground. Further, the walking motion of a pedestrian's feet will be correlated; when one foot is stationary, the other foot will be moving. By comparing the motion of features in the video with an expected characteristic pattern such as that of feet, feature such as feet and therefore pedestrians can be identified in the video.

Figure 1:
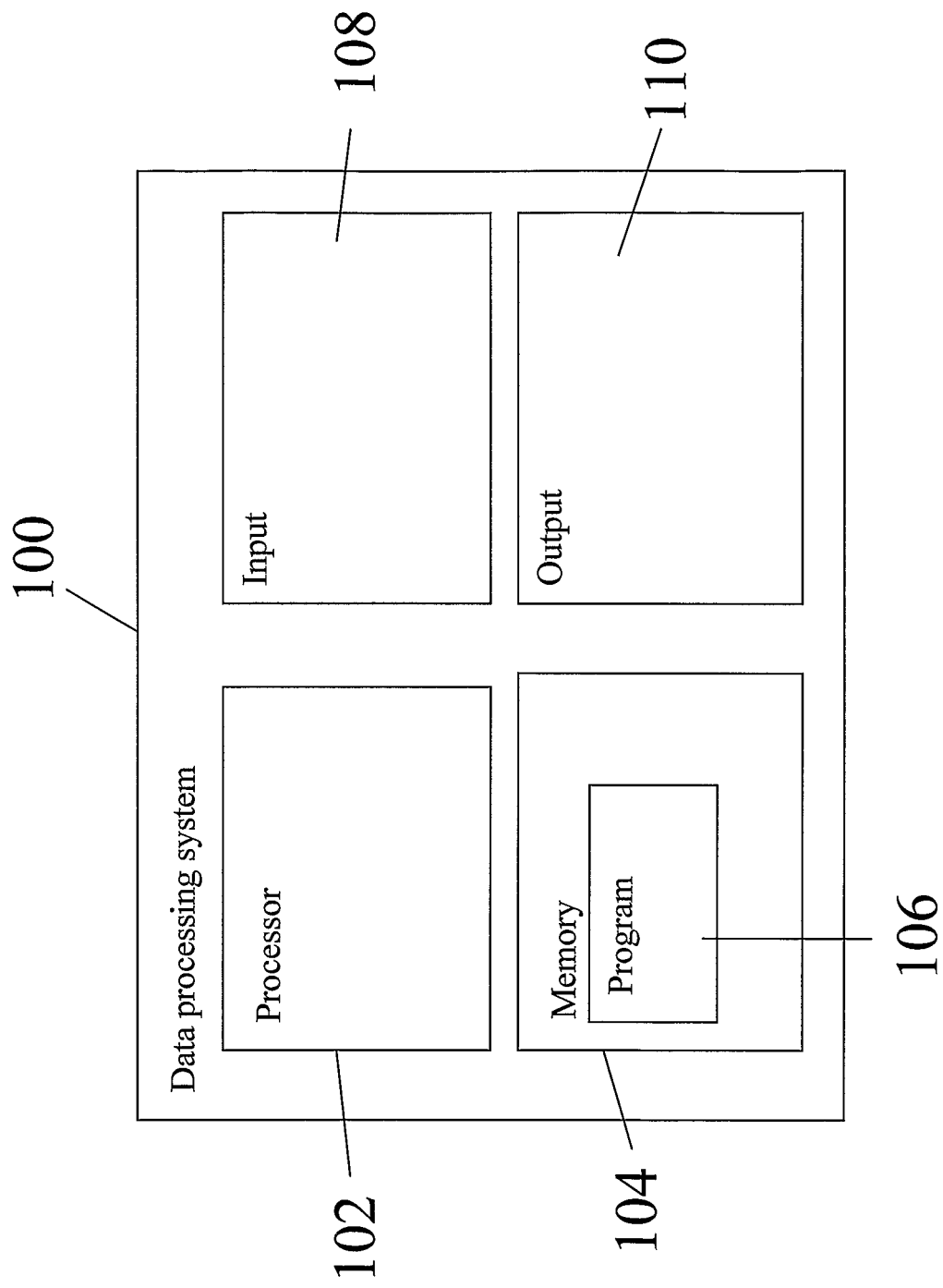
FIG. 1 is a block diagram of a data processing system.
Figure 2:
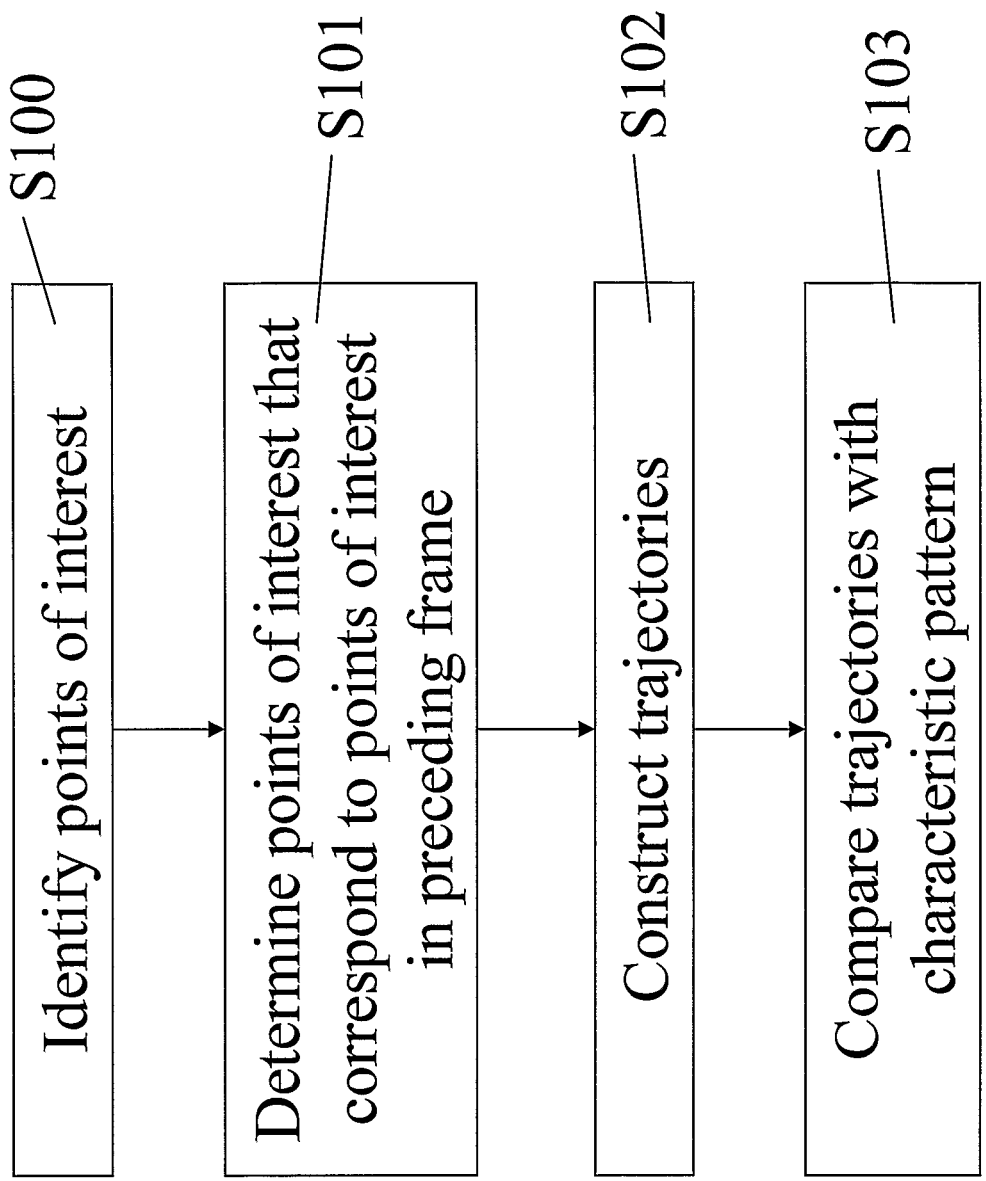
FIG. 2 is a flow diagram of a method for recognising a moving feature in a video.

To recognise a moving feature in a video, a trajectory for the feature over the frames of the video is required. In order to track the trajectory of an object in a video, it is necessary to identify the location of that object in the frames of the video. There are therefore two problems that must be addressed; the location of objects must be identified in each frame, and the same object must be identified in the frames over which it is to be tracked.

The step S100 of the method involves locating points of interest in each frame of the video sequence. Spatial patterns in the pixels of each frame indicative of certain features that may occur in more than one frame of the sequence are found. For example, the first step may involve detecting corners in each of the frames.

In order to find the trajectories of features in the video, in step S101, points of interest that correspond to features in the immediately preceding frame are determined.

In step S102, for a given point of interest in the first frame of the sequence, a set of possible trajectories is generated. The most general set of possible trajectories for that point of interest include the position in the next frame of any of the points of interest identified in the next frame. It is also possible that the trajectory leads to a position not shown in the frame, either outside the frame, or behind another object shown in the frame.

The set of possible trajectories is determined by considering pairs of frame and identifying potential matching points of interest between the pairs of frames. The pairs of matching points of interest are identified by calculating a matching score. The matching score takes factors such as the spatial distance between the locations of the points of interest and the similarity in appearance of the points of interest into account. This may be achieved by identifying points of interest that have a similar appearance, and/or a similar position within the two frames. From the potential matching pairs of frames, possible trajectories are constructed by tracing the matching pairs through the sequence of frames.

The set of possible trajectories for an object in the first frame of a video sequence may include a large number of points of interest in the second and subsequent frames. The set of possible trajectories is narrowed down by enforcing a constraint based on a pattern that the trajectory of the object is expected to follow. This can be, for example a physical rule such as that the speed of an object will be conserved.

Once the number of possible trajectories has been narrowed down, when a trajectory is required for further processing, a probabilistic selection of the probable trajectories is made. The resultant trajectory is used in the further processing, for example in a gesture recognition algorithm. It is noted that if the probabilistic selection is repeated the selected trajectory may be different.

The trajectories are then compared with a characteristic pattern of motion in step S103.

Figure 3:
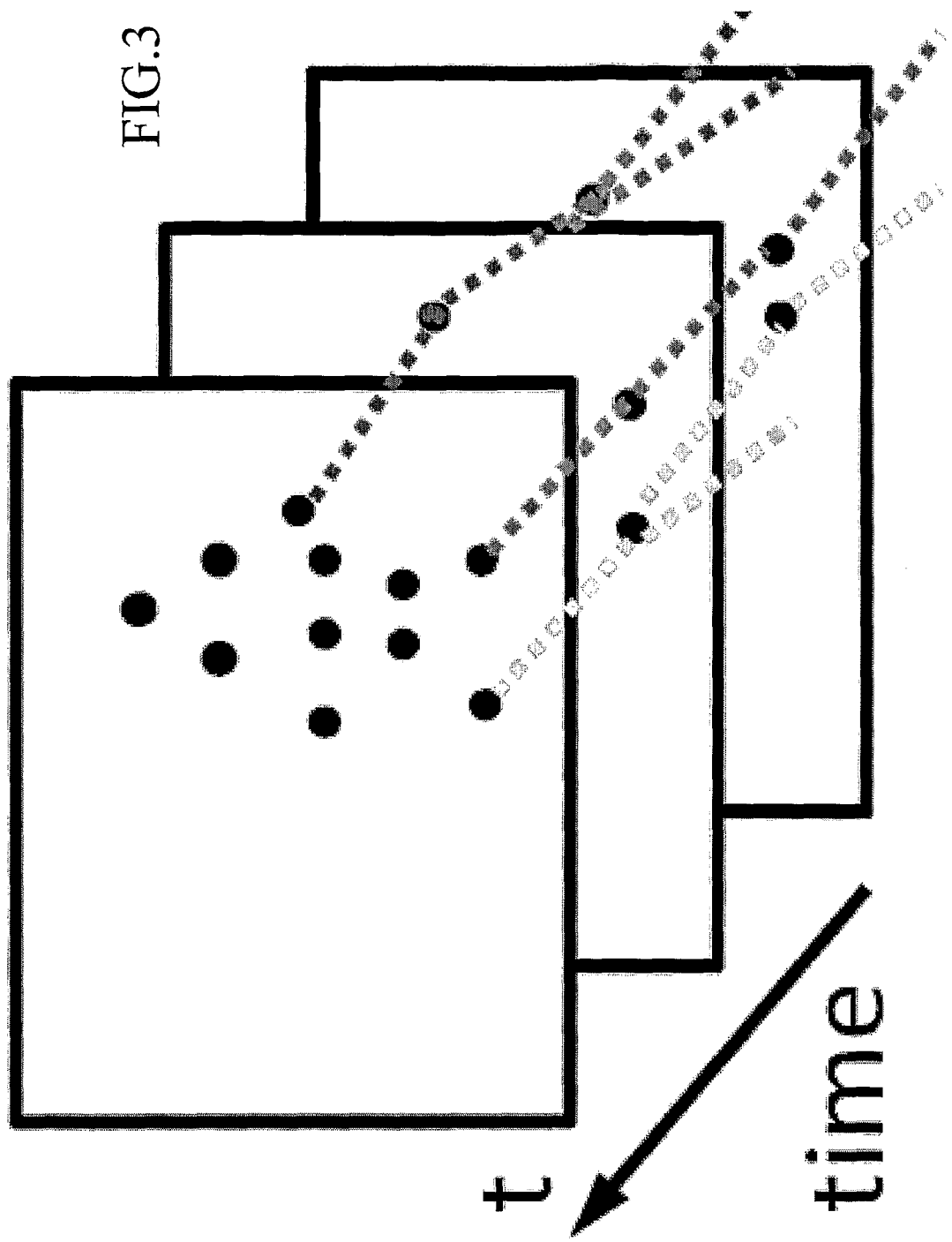
FIG. 3 shows the tracing of possible trajectories between frames.

FIG. 3 shows the tracing of possible trajectories between frames. The top frame in FIG. 3 is the most recent frame and earlier frames are shown beneath the most recent frame. In each of the frames of the input sequence, a number of points of interest are found. Possible correspondences between points of interest in neighbouring frames are indicated by links.

Figure 4:
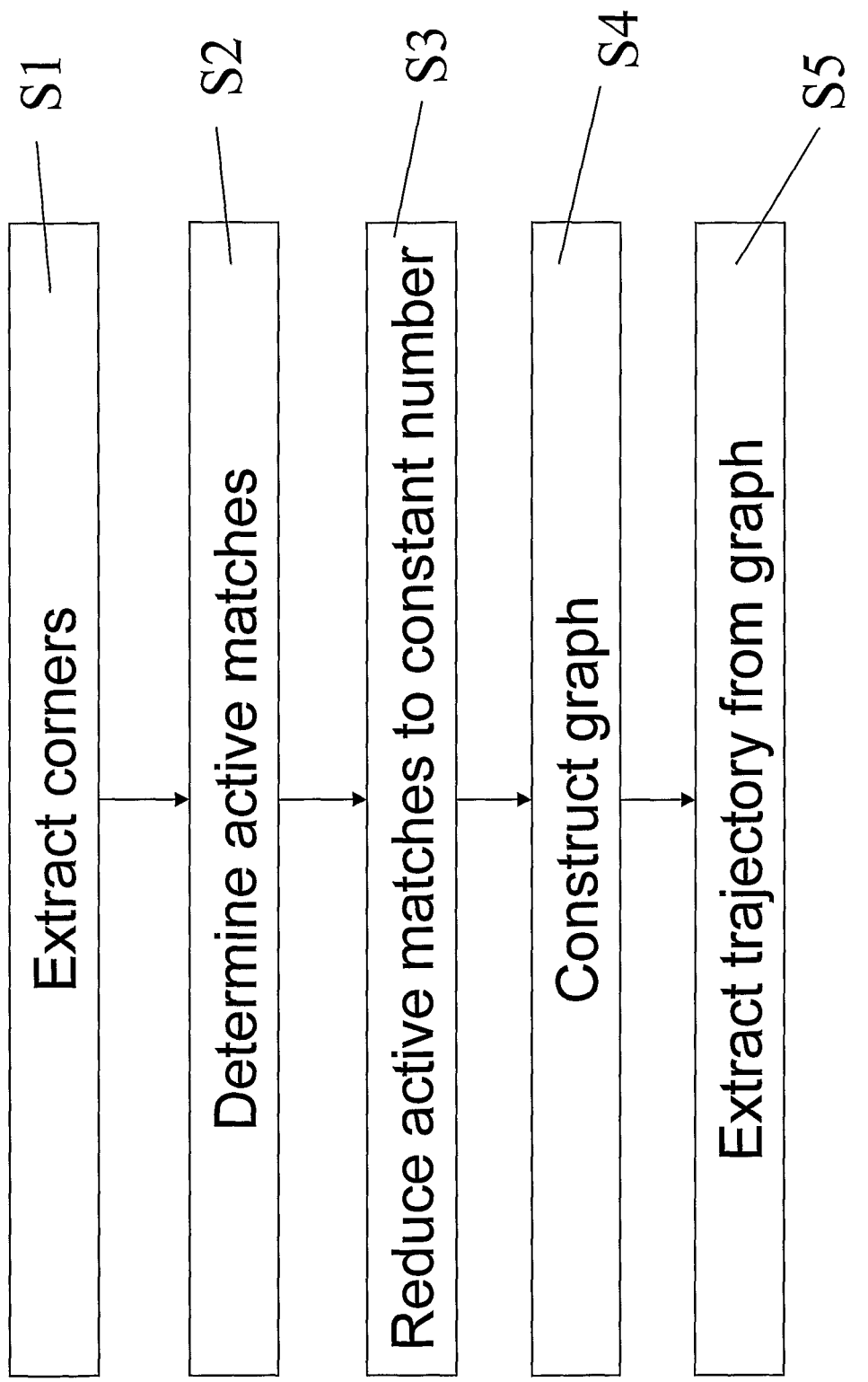
FIG. 4 is a flowchart illustrating a method of tracking objects in a video sequence.

FIG. 4 is a flowchart illustrating a method of tracking objects in a video sequence. The video sequence may be, for example, 350 frames of resolution 1280 by 720 pixels at 60 frames per second. In the method shown in FIG. 4 features are tracked by detecting corners in the frames of the video sequence. The method will be described with reference to the data processing system 100 shown in FIG. 1. In step S1, points of interest are extracted from each of the frames of the video sequence. A Harris corner detector is used to detect corners in each of the frames. The locations of point of interests in each of the frames are stored in a section of the memory 104. A Harris corner detector detects the locations of corners in an image by considering an area of the image and shifting it slightly and comparing the area with an overlapping area of the image. The Harris corner detector is implemented as part of the program 106. Corners are located where there is a change with respect to the overlapping area in all directions. Harris corner detectors are described in C. Harris and M. Stephens, 'A Combined Corner and Edge Detector', Proc. Forth Alvey Vision Conference, pages 147-151, 1988.

The points of interest in the frame at time t are denoted as $p_i(t)$, where $i=1, \ldots, n$ is an index for the points of interest. The two-dimensional location of the point of interest $p_i(t)$ in the frame t is $x_i(t)$.

In step S2, matches between the points of interest in the frames are determined. For each point of interest in a frame, points of interest in the previous frame that are potential ancestors are identified. This identification is carried out analysing points of interest in the previous frame that are within a certain range of the corner being considered in the present frame.

Figure 5:
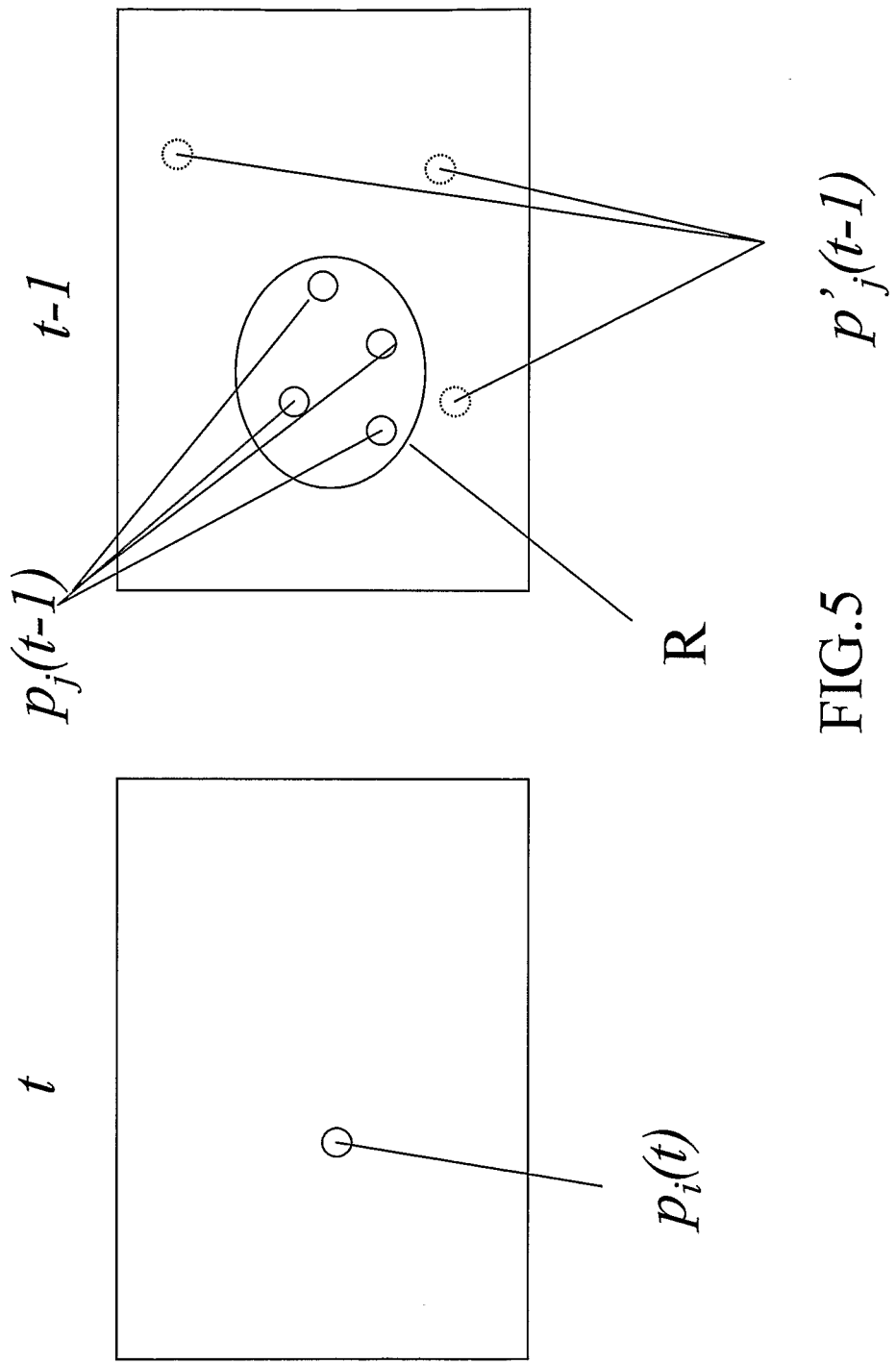
FIG. 5 shows the points of interest in a frame that are analysed as potential matches for a point of interest in a later frame.

FIG. 5 shows the points of interest $p_j(t-1)$ in a frame at time t-1 that are analysed as potential matches for a point of interest $p_i(t)$ in a frame at time t. The points of interest $p_j(t-1)$ that have positions $x_j(t-1)$ within a range R of the position $x_i(t)$ of the point of interest $p_i(t)$ in frame t are analysed. The points of interest $p'_j(t-1)$ that have positions $x'_j(t-1)$ outside the range R are not analysed as potential matches for the point of interest $p_i(t)$.

A temporal matching score is calculated for each pair of points of interest. The temporal matching score matches a point of interest in the present frame with a point of interest in the preceding frame.

The temporal matching score is based on the appearance similarity of the two points of interest and the spatial distance between them.

The temporal matching score between the point of interest $p_i(t)$ in the frame at time t and the point of interest $p_j(t-1)$ in the preceding frame at time t-1 is denoted as $P_{ij}(p_i(t), p_j(t-1))$, and can be calculated by the following formula:

$$P_{ij}(p_i(t),p_j(t-1)) \propto \exp(-\alpha S_{ij})\exp(-\beta D_{ij})$$

Where $S_{ij}$ is the appearance similarity between the point of interest $p_i(t)$ and the point of interest $p_j(t-1)$. The appearance similarity is calculated from the local image regions around the points of interest in their respective frames. It is calculated as the mean normalised sum of absolute differences between the local image regions. $D_{ij}$ is the spatial distance between the points of interest and is calculated from the following formula.

$$D_{ij}=\|x_i(t)-x_j(t-1)\|$$

Potential matches are identified based on the temporal matching score $P_{ij}$. A binary value $E_{ij}(t)$ is associated with each potential match between a point of interest $p_i(t)$ in the frame at time t and the point of interest $p_j(t-1)$ in the preceding frame at time t-1. Potential matches may be selected as the highest value of the temporal matching score for a given corner in the present frame, or all matches having temporal matching score within a threshold of the maximum value may be selected as potential matches. Thus $E_{ij}(t)=1$ when either:

$$P_{ij}=\max_j P_{ij} \text{ or}$$

$$P_{ij}+e>\max_j P_{ij}$$

Where e is a threshold.

Potential matches are also determined by considering the process in reverse; for each point of interest in the preceding frame, a temporal matching score is calculated for points of interest in the present frame.

In step S3, the total number of matches between two frames is limited. This is achieved by only keeping a fixed number of matches. The threshold e may be dynamically adjusted so that the number of matches between pairs of frames is constant. A total number of matches between frames of 4n has been found to be a suitable fixed number for the fixed number of matches. These are selected as those with the highest temporal matching score. This may result in some of the corners having no matches where the maximum matching score for a corner is a low value.

Following step S3, a number of points of interest in each frame in the sequence and a set of active matches of points of interest between frames are available to construct a graph from which probabilistic trajectories are extracted.

The graph is constructed in step S4. For each frame t, there is a set of points of interest $p_i(t)$ and between temporally adjacent frames, there is a set of matches $E_{ij}(t)$ between the points of interest of a frame at time t and a frame at time t-1. These are used to construct a graph $G_t(N,E)$. The nodes of the graph N represent matched points of interest in the preceding frames and edges E represent the matches between these points of interest. The graph is constructed by defining a root node for each of the points of interest in the final frame of the video sequence. Edges are added for each of the active matches from these points of interest to points of interest in the preceding frame. Nodes are defined for the matched points of interest in the preceding frame. The process is repeated for active matches from the frame preceding the final frame of the sequence, and an acyclic graph such as that shown in FIG. 6 below is generated that can be used to generate probabilistic trajectories. The graph is constructed for T frames. Each of the edges $E_{ij}(it)$ is given $P_{ij}(t)$ as its weighting factor.

The traceable depth of an edge, or the number of frames in which potential ancestors of a feature point $p_i(t)$ in the graph is written as $d[E_{ij}(t)]$.

Data representing the graph $G_t(N,E)$ is stored in the memory 104. The data is stored as values for $x_i(t)$ each of the N nodes and values of $P_{ij}(t)$ and $d[E_{ij}(t)]$ for each of the edges, $E_{ij}(t)$.

In step S5, a trajectory is generated by traversing the acyclic graph. The traversal is started at one of the root nodes and a probabilistic selection of edges is made. The process is repeated at each node. The probabilistic selection is made based upon an augmented probability. The augmented probability is calculated from the matching score and includes a factor to take into account the traceable depth and a speed conservation factor.

The augmented probability, or sampling probability $P'_{ij}(p_i(t), p_j(t-1))$ is given by the following formula:

$$P'_{ij}(p_i(t),p_j(t-1)) \propto P_{ij} \exp(-\gamma/(d[Eij]+1))\exp(-\delta V_{ij}))$$

Where $\gamma$ and $\delta$ are positive weighting factors and $V_{ij}$ is a speed conservation factor given by the following formula:

$$V_{ij}(T) = \|(x_h(T+1)-x_i(T))-(x_i(T)-x_j(T-1))\|$$

The above formula for the speed conservation factor takes into account the position of the point of interest in the frame in question $x_i(T)$, the position of the point of interest in the trajectory in the preceding frame $x_j(T-1)$ and the position of the point of interest being considered as the next point in the trajectory $x_h(T+1)$.

The use of an augmented probability that includes a factor dependant upon the traceable depth means that long trajectories are favoured. Long trajectories are likely to be of greater use than short trajectories. Further, the speed conservation factor means that links between feature points that preserve the speed of the object in the trajectory up to the frame under consideration are favoured. This ensures that smooth trajectories that are more likely to correspond to the motion of physical features are more likely to be followed when traversing the acyclic graph.

The acyclic graph can be traversed multiple times to generate a number of probabilistic trajectories for an object corresponding to a feature point in the final frame. The trajectories generated may be different, and thus at least some will not be correct, however, by allowing possible trajectories where there is uncertainty about the correspondence between consecutive frames, trajectories over relatively long sequences of frames can be obtained even where the objects are obscured for part of the sequence by occlusion.

Multiple trajectories for an object may be of use, particularly when used in conjunction with, for example, a pattern recognition algorithm that finds features within a video sequence that exhibit a particular characteristic motion. In such a case it may be beneficial to examine a number of possible trajectories for each point of interest in the final frame of the sequence and examine all the possible trajectories for those that exhibit the particular characteristic motion. The use of an acyclic graph to generate multiple possible trajectories is particularly suitable for such an application.

Following the traversal of the acyclic graph the probabilistic trajectories are stored in the memory 104 as $X_i(t)=[x(t), x(t-1), \ldots x(t-T+1)]$ which represents a set of locations in frames for the points belonging to the trajectory.

Figure 6:
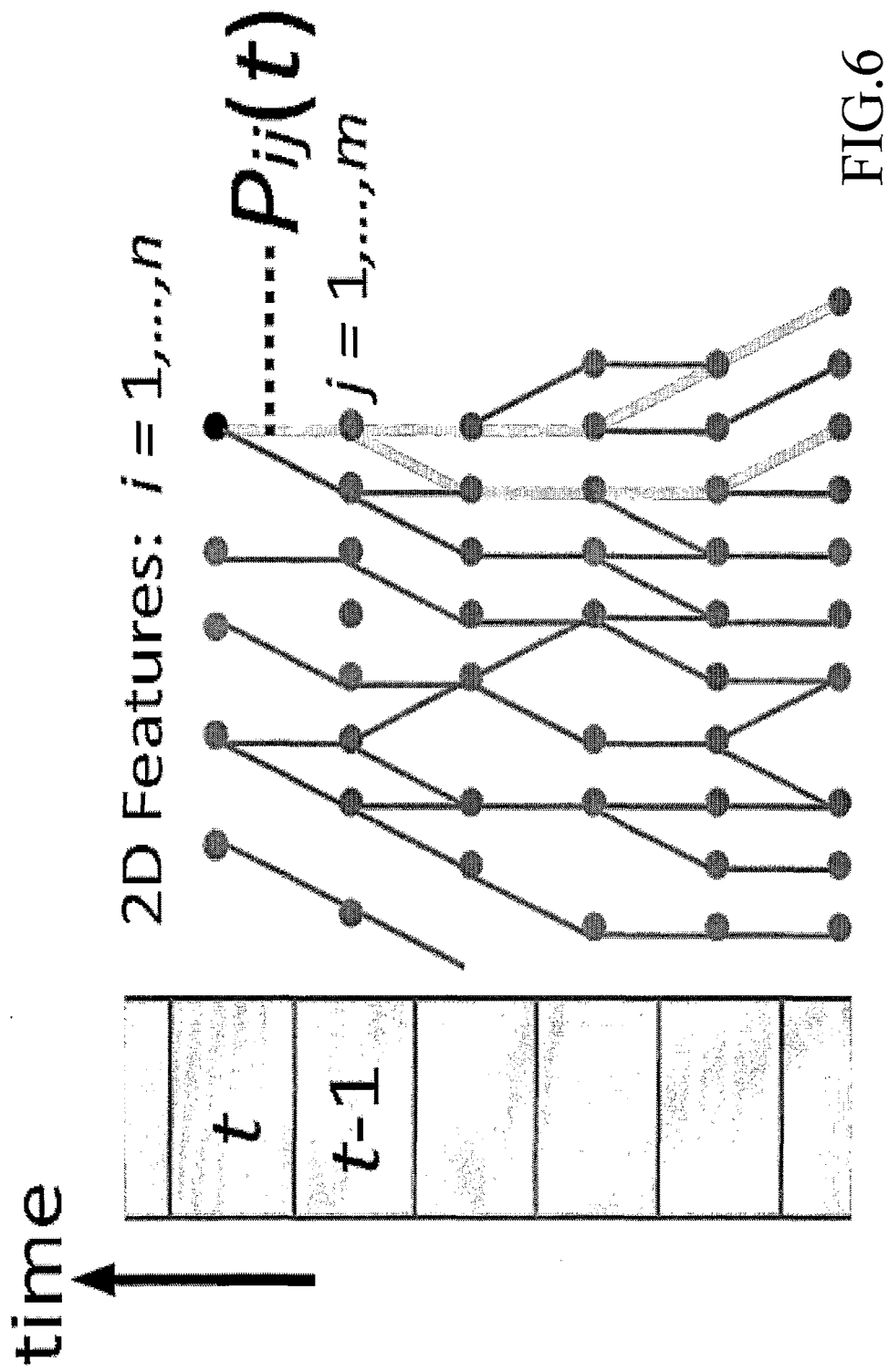
FIG. 6 shows an acyclic graph that is used to generate probabilistic trajectories for features.

FIG. 6 shows an acyclic graph that is used to generate probabilistic trajectories for features using the method described above. The points of interest in the most recent frame are shown as nodes at the top of the graph. These points of interest are linked to points of interest in the preceding frame by a set of edges. A temporal matching score is associated with each of the edges linking nodes representing points of interest in temporally adjacent frames.

In order to extract a trajectory from the graph for a point of interest, at each node one of the edges connecting that node to a node representing a point of interest in an earlier frame is selected.

To identify the walking motion of a pedestrian, the step of comparing trajectories with a characteristic pattern involves identifying features that potentially relate to a foot of a pedestrian and then finding pairs of such features with correlated motion which correspond to a pair of feet of a pedestrian. This is described in reference to FIG. 7.

Figure 7:
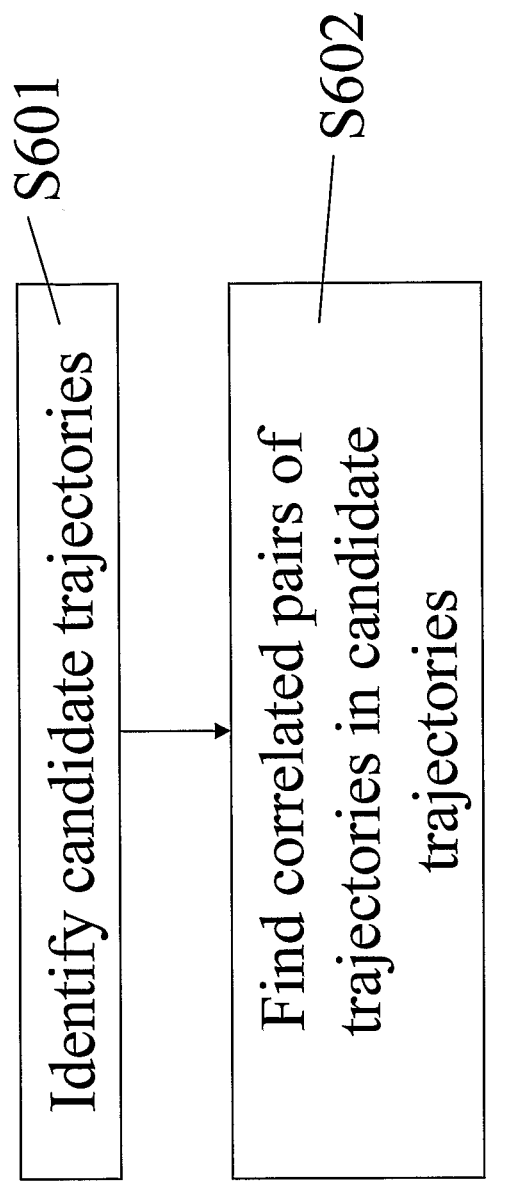
FIG. 7 shows a method of identifying the characteristic pattern of the walking motion of a pedestrian from a plurality of trajectories.

FIG. 7 shows a method of identifying the characteristic pattern of the walking motion of a pedestrian from a plurality of trajectories.

In step S601, candidate trajectories are identified. In order to determine whether a trajectory potentially relates to a foot, the motion of the trajectory over the time of approximately one walk cycle is analysed. If the trajectory relates to a point of interest corresponding to a location on a foot, then it is expected to exhibit a moving phase and a stationary phase within the walk cycle. Therefore, the candidate trajectories are identified in step S601 as those that exhibit a dynamic phase and a stationary phase within one walk cycle.

Once the candidate trajectories have been identified, correlated pairs of candidate trajectories are found in step S602. For a walking pedestrian, it is expected that the motion of two feet will be correlated. This correlation is both temporal and spatial. The temporal aspect of the correlation is that when one foot of a walking pedestrian is in the stationary phase, the other foot is expected to be in its dynamic phase. The spatial locations of the two feet are also expected to be correlated. In addition to these correlations, the directions of the motion of a pedestrian's feet are expected to be correlated. The trajectories of the two feet of a walking person are expected to be approximately parallel, in a direction which is the direction in which the pedestrian is walking. By identifying pairs of candidate trajectories that exhibit the correlations described above, pedestrians are identified in a video sequence from the motion of points of interest relating to the pedestrians' feet.

A random forest classifier can be used to classify the trajectories as relating to feet or not to feet to identify the candidate trajectories in step S601.

Figure 8:
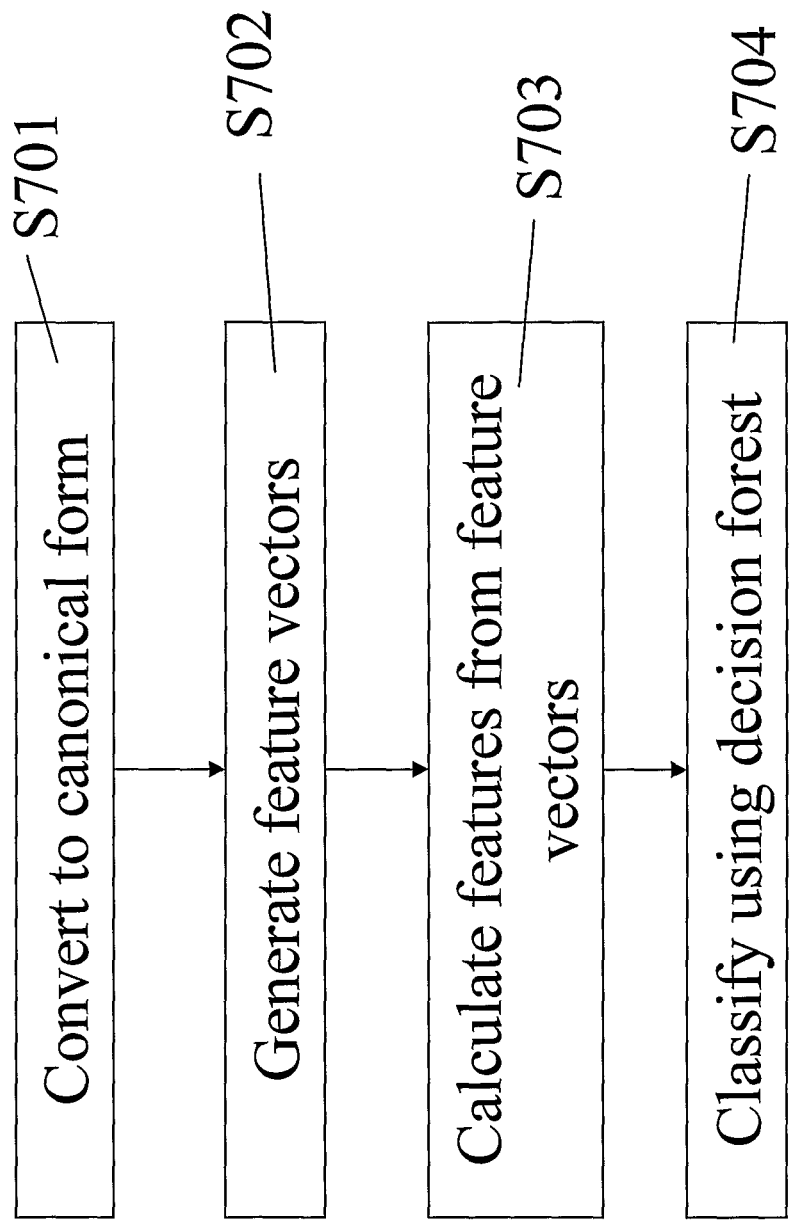
FIG. 8 shows a method of using a random forest classifier to classify trajectories as relating to feet or not.

A method of using a random forest classifier to classify trajectories as relating to feet or not is shown in FIG. 8. In step S701, the trajectory is converted to a canonical form. Converting the trajectory to a canonical form means that factors such as the angle of a trajectory, the speed of the walker that the trajectory may relate to, the amplitude of the steps of the walker and the phase are accounted for. The conversion to a canonical form may include the subtraction of linear motion such as the motion of the camera, and the normalisation aspects of the trajectory such as the step amplitude.

The trajectory is written as:

$$\tilde{X}_i(t) = [\tilde{x}(t), \tilde{x}(t-1), \ldots \tilde{x}(t-T+1)]^T$$

in its canonical form.

In step S702, feature vectors $v_0$ and $v_1$ are generated from the canonical form of the trajectory. These feature vectors are generated by cutting the trajectory into five sections by randomly selecting four times $t_0$, $t_1$, $t_2$, and $t_3$ at which the trajectory is cut.

The feature vectors are given by the following formulae:

$$v_0 = \bar{x}_i(t_1) - \bar{x}_i(t_0)$$

$$v_1 = \bar{x}_i(t_3) - \bar{x}_i(t_2)$$

Figure 8A:
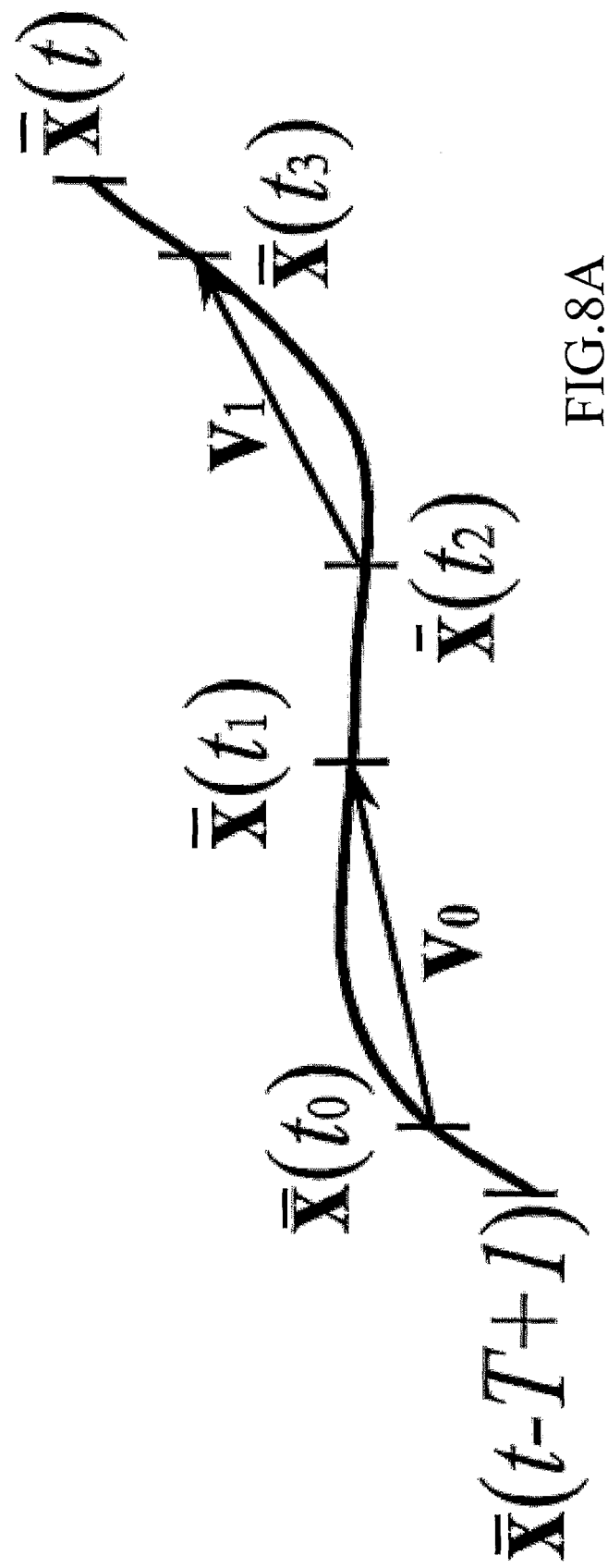
FIG. 8A shows an example of a pair of velocity vectors.

FIG. 8A shows an example of a pair of velocity vectors. In order to computer the features, many pairs of velocity vectors are sampled.

In step S703, features $f_s$ and $f_d$ are calculated from the feature vectors and randomly selected variables. The features are calculated as the distance and the dot product of the two vectors $v_o$ and $v_1$ using the following:

$$f_s = \|a_0 v_1 - a_1 v_0\|$$

$$f_d = <b_0 v_0, b_1 v_1>$$

Where $a_0$, $a_1$, $b_0$ and $b_1$ are random coefficients that take values between 0 and 1. By using different values for the cutting points, $t_0$, $t_1$, $t_2$, and $t_3$, and the coefficients, $a_0$, $a_1$, $b_0$ and $b_1$ Numerous variations in $f_s$ and $f_d$ can be made.

In step S704, the trajectories are classified as either relating to feet or not relating to feet using a random decision forest.

Figure 9:
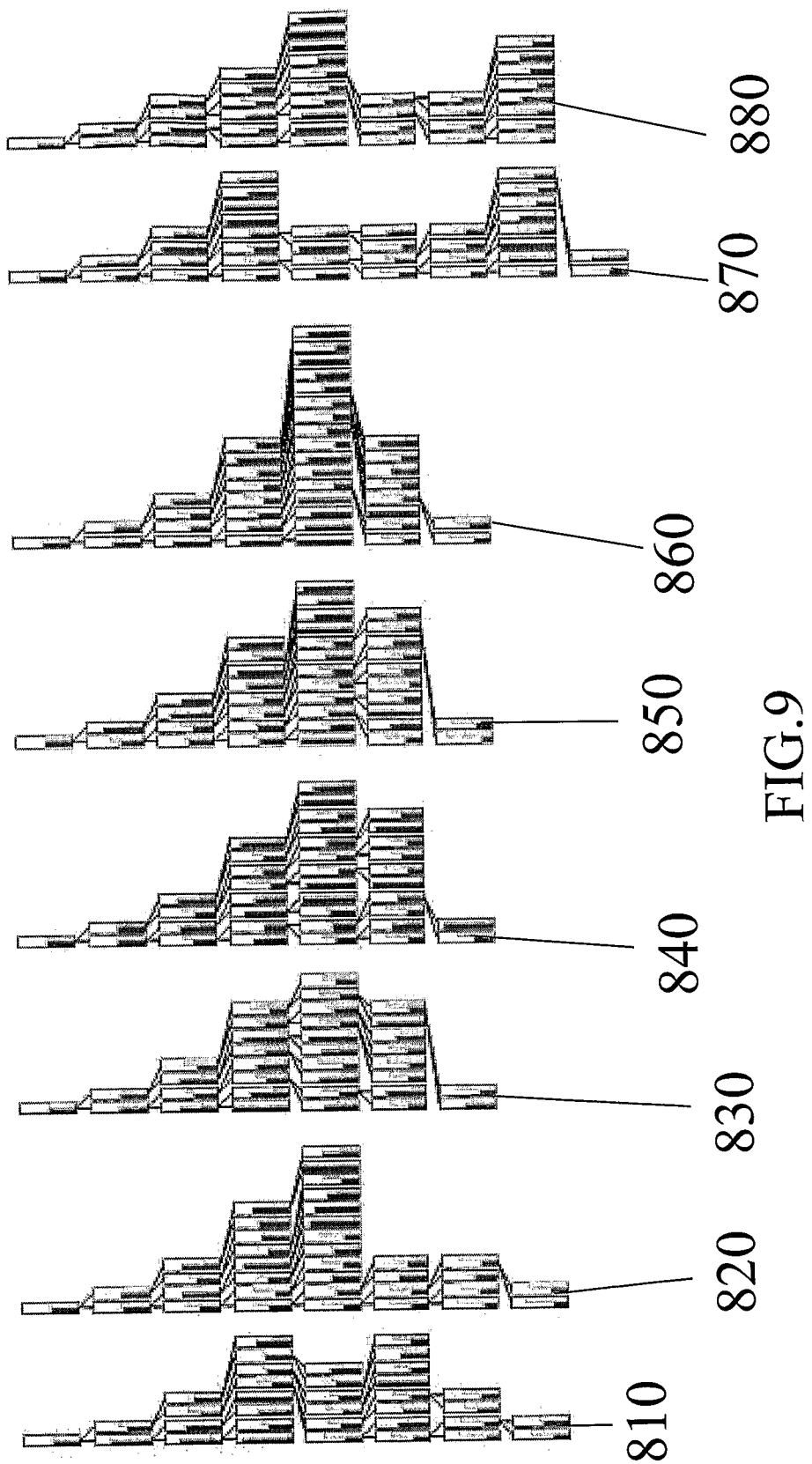
FIG. 9 shows a random decision forest.

FIG. 9 shows a random decision forest 800. The random decision forest 800 has 8 decision trees 810, 820, 830, 840, 850, 860, 870 and 880. Each trajectory is classified using all 8 of the trees. At each branching point of the trees, a function of $f_s$ and $f_d$ using the parameters $t_0$, $t_1$, $t_2$, $t_3$, $a_0$, $a_1$, $b_0$ and $b_1$, is calculated, based on the value of this function a decision is made to either follow the left or the right branch is made. The values of the threshold $\theta$ which is used to select where the left or right branch is chosen is selected so that the information increase in the foot/non-foot distribution will be maximum.

Figure 10:
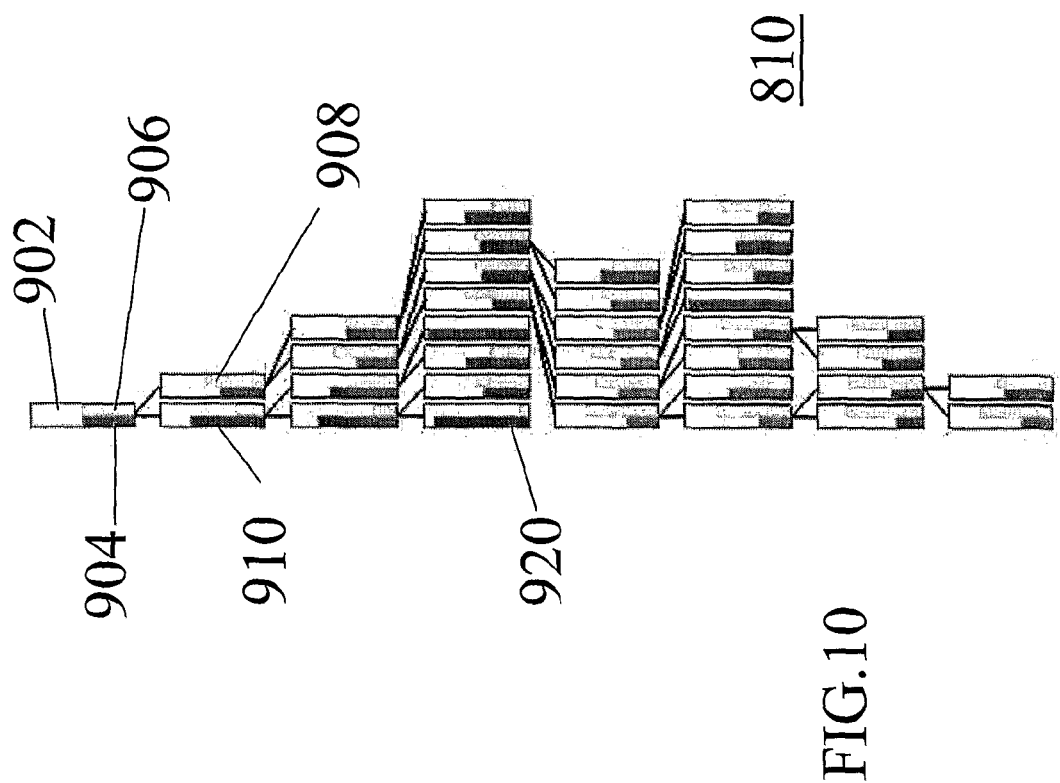
FIG. 10 shows a decision tree from the random decision forest.

FIG. 10 shows a decision tree 810 from the decision forest 800 shown in FIG. 9. At each node of the decision tree 902, the relative probability that a trajectory that reaches that node when traversing the tree is shown by the heights of the two vertical bars. At the root node 902 of the decision tree 810, the vertical bar for a trajectory relating to a foot feature 904 and the vertical bar for a trajectory relating to non-foot feature 906 are equal as there is no information whether a feature at this point is a foot or not. In traversal of the tree, the value of a function of $f_s$ and $f_d$ is calculated and based on that value for the trajectory in question, either the node 910 on the left branch, or the node 908 on the right branch is reached. The traversal continues with the value of a different function being calculated at each branching point. Once a leaf node (for example 920) is reached, the relative probabilities from the tree 810 is combined with the relative probabilities from the other trees in the decision forest and based upon this probability, the trajectory is classified as either a foot or a non-foot.

The random forest is stored as a set of values for the parameters $t_0$, $t_1$, $t_2$, $t_3$, $a_0$, $a_1$, $b_0$ and $b_1$, functions of $f_s$ and $f_d$, and a threshold $\theta$ for each branching point. These values are stored in the memory 104. They are calculated prior to the running of the program 106 by manually annotating features in a video sequence and calculating the values of the functions of $f_s$ and $f_d$, and selecting the values for the threshold $\theta$ that gives the largest information gain.

Once candidate trajectories for feet have been identified they are analysed to find correlated pairs of feet relating to the same pedestrian. This analysis is also carried out using a random decision forest in a manner similar to that described above. The functions used to make the decisions when traversing the trees in the random decision forest are calculated based on the correlation of the directions of motion of the two trajectories under consideration and the correlation of the moving and stationary phases of the motion in the trajectories.

Figure 11:
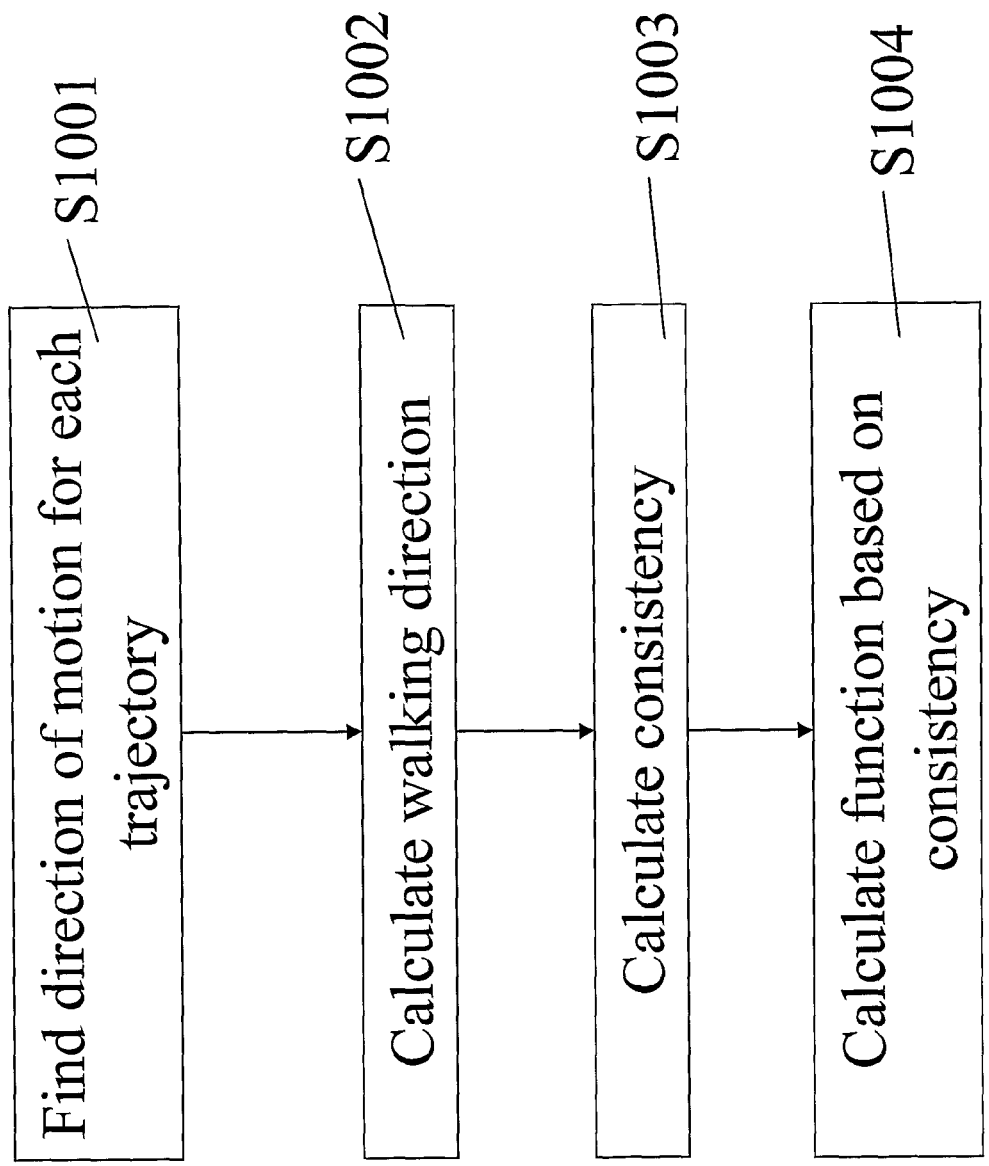
FIG. 11 shows a method of calculating a function based on the correlation between directions of motion of two trajectories.

FIG. 11 shows a method of calculating a function based on the correlation between directions of motion of two trajectories $X_i(t)$ and $X_u(t)$. In step S1001, a direction of motion is found for each trajectory. The direction of motion for a trajectory $X_i(t)$ is found by calculating the covariance matrix of the set of positions $x_i(T)$, $T=t \ldots t-T+1$ and then the eigenvector $\xi_i$ corresponding to the greatest eigenvalue of the covariance matrix. Thus, $\xi$ represents the primary direction of NO. The primary direction $\xi_d$ of the second trajectory $X_u(t)$ is calculated analogously.

Figure 11A:
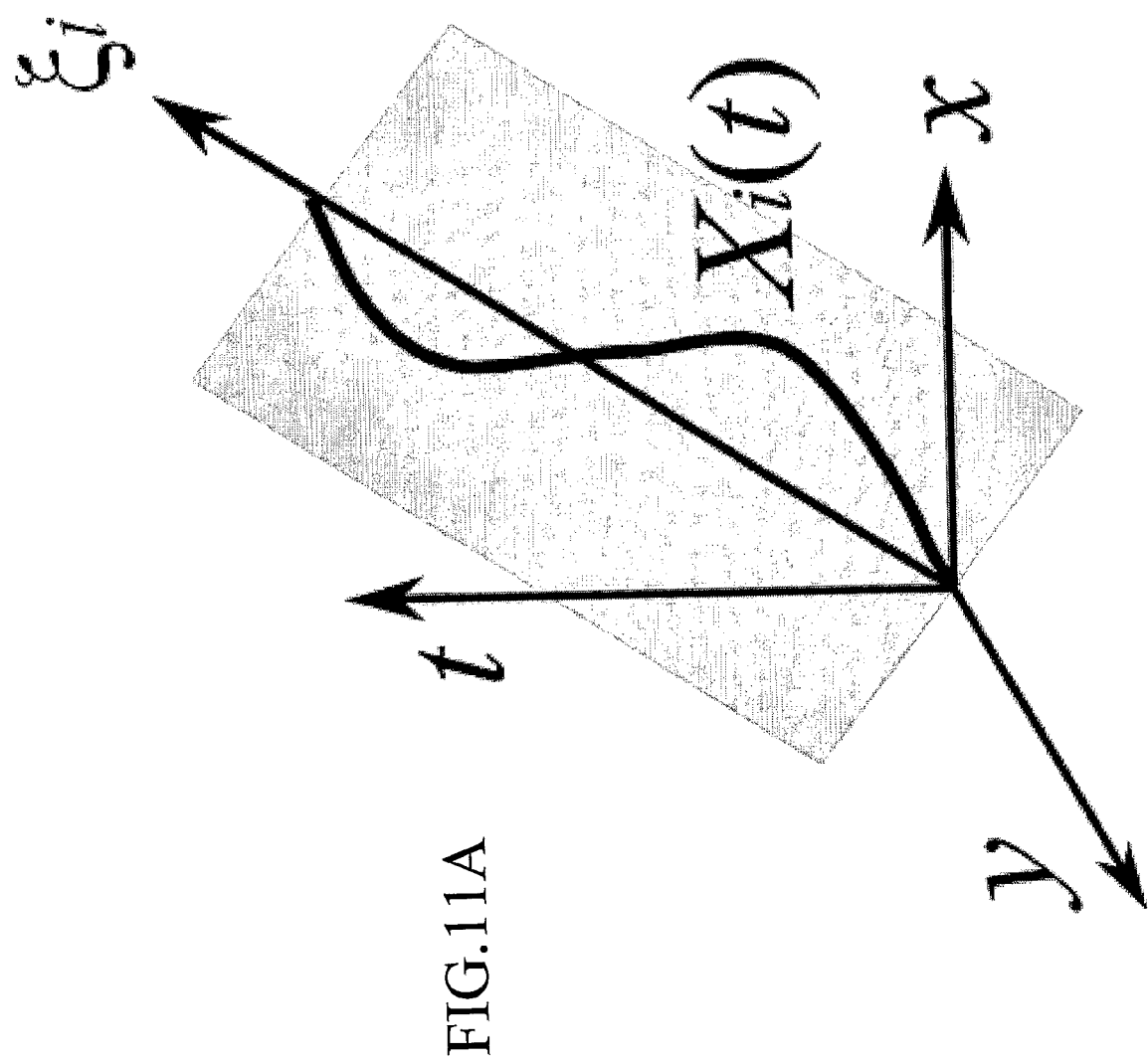
FIG. 11A shows an example of a trajectory and its primary direction vector.

FIG. 11A shows an example of a trajectory $x_i(t)$ and the primary direction vector In step S1002, a walking direction vector $x_{iu}(t)$ is calculated for the two trajectories based on the locations $x_i(t)$ and $x_u(t)$ of the points of interest in the frame at time t relating to the two trajectories.

$$x_{iu}(t) = x_i(t) - x_u(t)$$

In step S1003, a consistency c based on dot products of the directions of motion with each other and with the walking direction is calculated.

$$c = \begin{bmatrix} \|\langle \xi_i, \xi_u \rangle\| \\ \|\langle \xi_i, x_{iu}(t) \rangle\| \\ \|\langle \xi_u, x_{iu}(t) \rangle\| \end{bmatrix}$$

The consistency exploits the fact that it is expected that the directions of movement of the feet of a pedestrian will be close to parallel and that these directions will be approximately parallel with the walking direction of the pedestrian.

In step S1004 a function $f_0$ based on the consistency and a random vector $\phi$ is calculated.

$$f_o = \langle \phi, c \rangle$$

Figure 12:
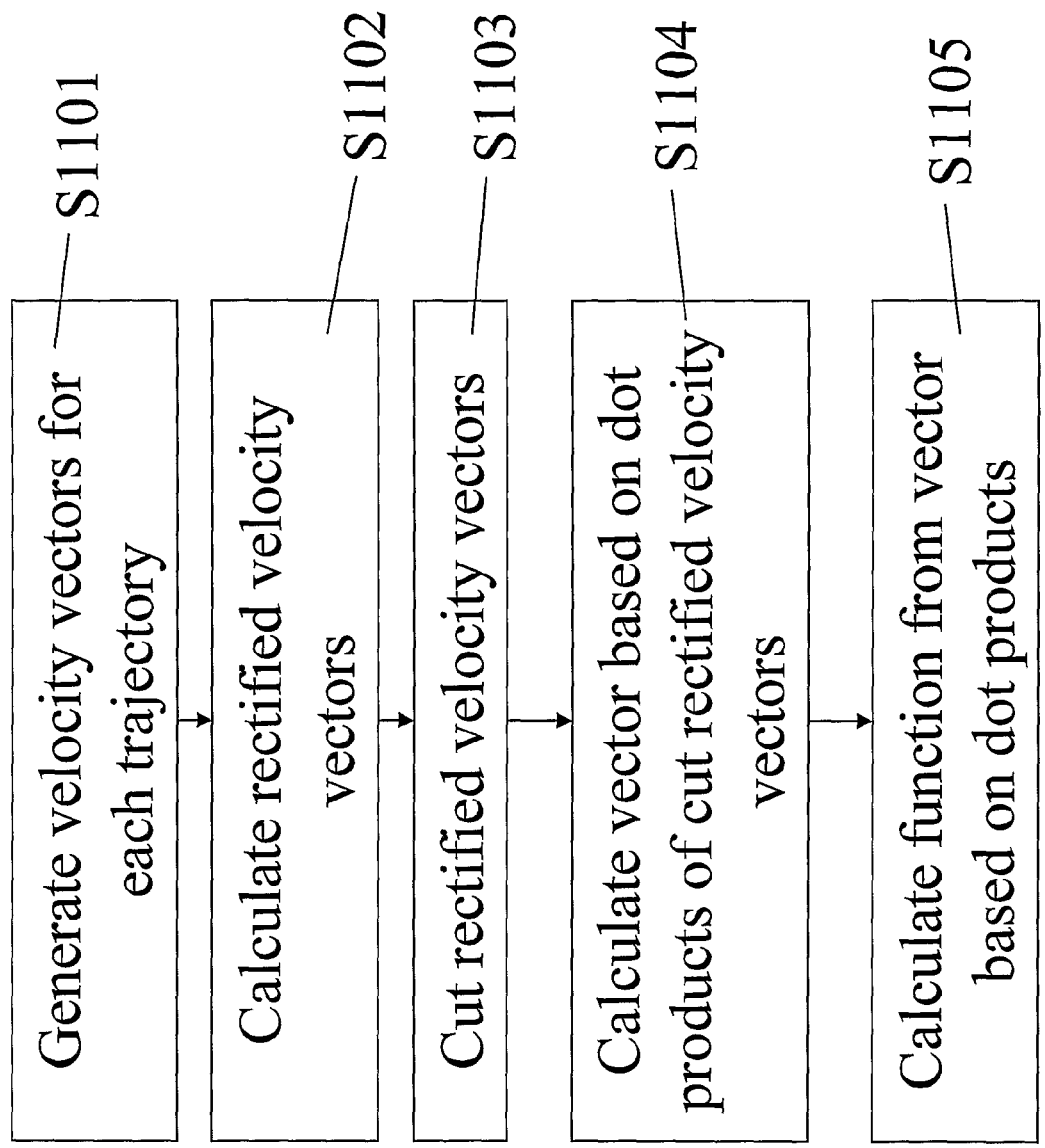
FIG. 12 shows a method of calculating a function based on the temporal correlation of the phases of motion of the two trajectories.

FIG. 12 shows a method of calculating a function based on the temporal correlation of the phases of motion of the two trajectories $X_i(t)$ and $X_u(t)$ under consideration.

In step S1101, velocity vectors $Y_i(t)$ are calculated for the trajectories.

$$Y_i(t) = [y(t), y(t-1), \ldots, y(t-T+2)]^T \in R^{2(T-1)}$$

Where $y(T) = x(T) - x(T-1)$ for $T=t, \ldots t-T+2$.

In step S1102, rectified velocity vectors are calculated. Using the equation:

$$\breve{y}(\tau) = \hat{y}(\tau) - \min_\tau \hat{y}(\tau)$$

constant camera motion is cancelled. The rectified velocity vectors are then generated using the following equation:

$$\breve{Y}_i(t) = [\breve{y}(t), \breve{y}(t-1), \ldots, \breve{y}(t-T+2)]^T$$

In step S1103, the rectified velocity vectors are cut into I pieces at fixed cutting points, and in step S1104, a vector based on the dot products of the cut rectified velocity vectors is calculated.

$$q = [\langle \breve{Y}'_i(t), \breve{Y}'_u(t) \rangle, \ldots, \langle \breve{Y}'_i(t_{I-2}), \breve{Y}'_u(t_{I-2}) \rangle]^T \in R^I$$

Finally in step S1105, a function based on the vector and a random vector is calculated:

$$f_p = \langle \psi, q \rangle$$

A second random decision forest is used to classify pairs of trajectories as relating to pairs of feet or not. The result of the decision forest may be a large number of pairs of trajectories relating to the same pair of feet. A mean shift algorithm is used to find the main clusters and the average of the most probable cluster is taken as the final result.

The invention claimed is:

1. A method of recognising a moving feature in a video sequence, said moving feature having a characteristic pattern over said video sequence, said video sequence comprising a first frame and a plurality of following frames, said method comprising
identifying points of interest in each frame of said video sequence;
determining, for each frame other than said first frame, at least one point of interest that corresponds to a point of interest in the preceding frame in said video sequence;
constructing a plurality of trajectories for a point of interest in said first frame, each trajectory comprising a location in said first frame and at least one of said following frames of said video sequence, said location in said first frame being the location of said point of interest in said first frame, said location in said at least one following frame being determined by sequentially considering each following frame of said sequence where at least one trajectory extends to the preceding frame and including in that trajectory the location of the point of interest that corresponds to a point of interest in the preceding frame included in the trajectory; and comparing said plurality of trajectories with said characteristic pattern.

2. The method of claim 1, wherein determining, for each frame other than said first frame, at least one point of interest that corresponds to a point of interest in the preceding frame in said video sequence comprises considering said video sequence as a sequence of overlapping pairs of frames, wherein each pair of frames has a first frame and a second frame and said pairs of frames overlap such that said second frame is considered the first frame in the subsequent pair of frames in said sequence, for each pair of frames calculating a probability that each of a plurality of points of interest in the second frame of a pair of frames corresponds to the same feature as a point of interest in the first frame in said pair of frames; and for each pair of frames, selecting, said at least one point of interest that corresponds to a point of interest in the preceding frame of said video sequence based on said probability for that pair.

3. The method of claim 2, wherein said probability that each of a plurality of points of interest in the second frame of a pair of frames corresponds to the same feature as a point of interest in the first frame in said pair of frames is based on the spatial distance and/or the similarity between the points of interest in the second frame and the point of interest in the first frame.

4. The method of claim 1, wherein constructing a plurality of trajectories for a point of interest in said first frame comprises constructing an acyclic graph with nodes representing the points of interest in the frames and edges linking points of interest that correspond to the same feature in subsequent frames, and traversing said acyclic graph to generate said plurality of trajectories.

5. The method of claim 4, wherein traversing said acyclic graph comprises making a probabilistic selection of edges at each node, based on an augmented probability.

6. The method of claim 5, wherein said augmented probability comprises a factor based on a traceable depth of the trajectory.

7. The method of claim 5, wherein said augmented probability comprises a factor based on the conservation of a physical quantity.

8. The method of claim 7, the physical quantity being speed.

9. The method of claim 1, wherein comparing said plurality of trajectories with said characteristic pattern comprises using a random decision forest.

10. The method of claim 1, wherein said characteristic pattern comprises a correlation between two trajectories from said plurality of trajectories.

11. The method of claim 10, wherein said correlation is a correspondence between a static phase of one trajectory of said two trajectories and a dynamic phase of the other trajectory of said two trajectories.

12. The method of claim 10, wherein said correlation comprises a correspondence in the directions of said two trajectories.

13. The method of claim 10, wherein said correlation is determined using a random decision forest.

14. A non-transitory computer readable medium carrying computer executable instructions which when executed on a computer cause said computer to carry out a method in accordance with claim 1.

15. A video analysis system comprising:
an input module operable to receive a video sequence comprising a first frame and a plurality of following frames;
a storage module; and
a processor operable to
identify points of interest in each frame of said video sequence,
store said points of interest in said storage module;
determine for each frame other than said first frame, at least one point of interest that corresponds to a point of interest in a preceding frame of said video sequence;
construct a plurality of trajectories for a point of interest in said first frame, each trajectory comprising a location in said first frame and at least one of said following frames of said video sequence, said location in said first frame being the location of said point of interest in said first frame, said location in said at least one following frame being determined by sequentially considering each following frame of said sequence where at least one trajectory extends to the preceding frame and including in that trajectory the location of the point of interest that corresponds to a point of interest in the preceding frame included in the trajectory; and
compare said plurality of trajectories with a characteristic pattern of a moving feature.

16. The video analysis system of claim 15, further comprising storage for an acyclic graph comprising nodes representing said points of interest in said frames and for each frame, at least one edge linking said at least one point of interest to said corresponding point of interest in said preceding frame, wherein said processor is further operable to traverse said acyclic graph to construct said plurality of trajectories for said point of interest in said first frame.

17. The video analysis system of claim 15, wherein said characteristic pattern comprises a correlation between two trajectories from said plurality of trajectories.

18. The video analysis system of claim 17, wherein said correlation is a correspondence between a static phase of one trajectory of said two trajectories and a dynamic phase of the other trajectory of said two trajectories.

19. The video analysis system of claim 16, wherein said processor is operable to determine for each frame other than said first frame, at least one point of interest that corresponds to a point of interest in a preceding frame of said video sequence by calculating a spatial distance and/or an appearance similarity between said at least one point of interest and said point of interest in said preceding frame.

20. The video analysis system of claim 16, said storage module being further operable to store a random forest classifier and said processor being further operable to use said random forest classifier to compare said plurality of trajectories with said characteristic pattern.

* * * * *